(12) United States Patent
Ogata et al.

(10) Patent No.: US 12,553,493 B2
(45) Date of Patent: Feb. 17, 2026

(54) DAMPER APPARATUS

(71) Applicants: NISSAN MOTOR CO., LTD., Yokohama (JP); EXEDY CORPORATION, Neyagawa (JP)

(72) Inventors: Makoto Ogata, Kanagawa (JP); Masayuki Ootani, Kanagawa (JP); Takeshi Senoue, Neyagawa (JP); Masahiro Nakatani, Neyagawa (JP)

(73) Assignees: NISSAN MOTOR CO., LTD., Yokohama (JP); EXEDY CORPORATION, Neyagawa (JP)

( * ) Notice: Subject to any disclaimer, the term of this patent is extended or adjusted under 35 U.S.C. 154(b) by 359 days.

(21) Appl. No.: 18/043,763

(22) PCT Filed: Aug. 27, 2021

(86) PCT No.: PCT/JP2021/031578
§ 371 (c)(1),
(2) Date: Mar. 2, 2023

(87) PCT Pub. No.: WO2022/050196
PCT Pub. Date: Mar. 10, 2022

(65) Prior Publication Data
US 2023/0313860 A1    Oct. 5, 2023

(30) Foreign Application Priority Data

Sep. 4, 2020   (JP) ................... 2020-148674

(51) Int. Cl.
*F16F 15/129*    (2006.01)
*F16F 15/139*    (2006.01)

(52) U.S. Cl.
CPC ...... *F16F 15/1292* (2013.01); *F16F 15/1392* (2013.01)

(58) Field of Classification Search
CPC ......................... F16F 15/1292; F16F 15/1392
(Continued)

(56) References Cited

U.S. PATENT DOCUMENTS 6,050,382 A * 4/2000 Ester ................. F16F 15/129
                                                        192/213.22
6,872,142 B2 * 3/2005 Aoki ................. F16F 15/1236
                                                        464/68.41
(Continued)

FOREIGN PATENT DOCUMENTS

EP    0 382 197 B1    8/1993
JP    2000-179622 A   6/2000
(Continued)

*Primary Examiner* — Greg Binda
(74) *Attorney, Agent, or Firm* — Foley & Lardner LLP (57) ABSTRACT

A friction generating mechanism of a damper apparatus includes a bushing in contact with an annular friction surface of a spline hub, and a cone spring arranged in a compressed state between a retaining plate and the bushing. A first load support surface of the bushing and a second load support surface of the retaining plate have step portions recessed so as to respectively receive an outer peripheral edge and an inner peripheral edge of the cone spring, when the taper of the cone spring is reversed. The radial positions of boundaries of the step portions are in a relationship of D1>D2, which inhibits the cone spring from being reversed even when an excessive load in the axial direction is input.

9 Claims, 9 Drawing Sheets

(58) Field of Classification Search
USPC ......... 464/68.41; 192/210.1, 213.12, 213.22, 192/213.31, 214.1
See application file for complete search history.

(56) References Cited

U.S. PATENT DOCUMENTS 8,696,474 B2 * 4/2014 Saeki .................. F16F 15/1292
464/68.41
2003/0045362 A1 3/2003 Aoki et al.

FOREIGN PATENT DOCUMENTS

JP  2003-074636 A  3/2003
JP  2006-170388 A  6/2006

* cited by examiner

DAMPER APPARATUS

TECHNICAL FIELD

The present invention relates to a damper apparatus to be disposed, for example, between an internal combustion engine and a transmission.

BACKGROUND ART

An automobile often includes a damper apparatus disposed between an internal combustion engine and a transmission and structured to transfer torque while absorbing and damping torsional vibration, Patent Document 1 discloses a damper apparatus of such kind that includes an input-side rotor, an output-side rotor, and coil springs, wherein: the input-side rotor receives torque inputted from an internal combustion engine; the output-side rotor is combined with the input-side rotor so as to be relatively rotatable with respect to the input-side rotor; and the coil springs are disposed between the input-side rotor and the output-side rotor, and are arranged such that each of the coil springs extends along a tangential line of rotation.

The damper apparatus disclosed in Patent Document 1 further includes a friction generation mechanism structured to generate frictional torque in response to relative rotation between the input-side rotor and the output-side rotor. The friction generation mechanism includes a spline hub serving as the output-side rotor, a bush being in sliding contact with the spline hub, and an annular cone spring biasing the bush in an axial direction.

The cone spring in Patent Document 1 has a tapered cross section with a relatively small inclination, and is inclined so as to include an inner periphery axially adjacent to the bush and an outer periphery axially adjacent to a retention plate. These configurations may cause the cone spring to be turned over into a taper orientation reversed with respect to the original one in case that, for example, the spline hub receives an enormous load in the axial direction and is displaced to flatten the cone spring. In other words, Patent Document 1 fails to consider such turning over phenomenon upon setting a position of a point of action of a pressing force exerted from the retention plate to the cone spring and a position of a point of action of an opposite pressing force exerted from the bush to the cone spring.

PRIOR ART DOCUMENT(S)

Patent Document(s)

Patent Document 1: JP 2003-074636 A or its U.S. equivalent, U.S. Pat. No. 6,872,142

SUMMARY OF THE INVENTION

According to the present invention, a damper apparatus may include: a first rotor; a second rotor; a spring connecting the first rotor and the second rotor elastically; and a friction generation mechanism structured to generate frictional torque in response to relative rotation between the first rotor and the second rotor. The friction generation mechanism may include: a bush being in contact with an annular friction surface of the second rotor; a retention plate that is a part of the first rotor, and faces the bush in an axial direction; and a cone spring that has an annular shape, and is disposed between the bush and the retention plate so as to be compressed, and biases the bush toward the annular friction surface of the second rotor.

According to a first aspect, the bush includes a first load support surface being in contact with an inner periphery of the cone spring, while the retention plate includes a second load support surface being in contact with an outer periphery of the cone spring, wherein the first load support surface and the second load support surface face each other. The first load support surface and the second load support surface respectively include a first step part and a second step part that are retracted in the axial direction so as to respectively accept the outer periphery and the inner periphery of the cone spring in case that the cone spring is installed at a reversed orientation. The first step part of the first load support surface has a boundary that is positioned outer in a radial direction, with respect to a boundary of the second step part of the second load support surface.

According to a second aspect, the bush includes a first load support surface being in contact with an inner periphery of the cone spring, while the retention plate includes a second load support surface being in contact with an outer periphery of the cone spring, wherein the first load support surface and the second load support surface face each other. The first load support surface includes a first step part that is retracted in the axial direction so as to accept the outer periphery of the cone spring in case that the cone spring is installed at a reversed orientation. The first step part of the first load support surface has a boundary that is positioned outer in a radial direction, with respect to an inner peripheral edge of the second load support surface being flat.

According to a third aspect, the bush includes a first load support surface being in contact with an outer periphery of the cone spring, while the retention plate includes a second load support surface being in contact with an inner periphery of the cone spring, wherein the first load support surface and the second load support surface face each other. The first load support surface and the second load support surface respectively include a first step part and a second step part that are retracted in the axial direction so as to respectively accept the inner periphery and the outer periphery of the cone spring in case that the cone spring is installed at a reversed orientation. The first step part of the first load support surface has a boundary that is positioned inner in a radial direction, with respect to a boundary of the second step part of the second load support surface.

According to a fourth aspect, the bush includes a first load support surface being in contact with an outer periphery of the cone spring, while the retention plate includes a second load support surface being in contact with an inner periphery of the cone spring, wherein the first load support surface and the second load support surface face each other. The first load support surface includes a first step part that is retracted in the axial direction so as to accept the inner periphery of the cone spring in case that the cone spring is installed at a reversed orientation. The first step part of the first load support surface has a boundary that is positioned in a radial direction within a radial range of the second load support surface being flat.

According to the above configurations, the cone spring is sandwiched by flat sections of the first load support surface and the second load support surface, even if the cone spring is flatten due to an excessive load in the axial direction. This suppresses the cone spring from receiving a moment to reverse a taper of the cone spring from an original orientation into a reversed orientation, and thereby avoids turning over of the cone spring.

MODE(S) FOR CARRYING OUT THE INVENTION

The following details the first embodiment of the present invention, with reference to the drawings.

Figure 1:
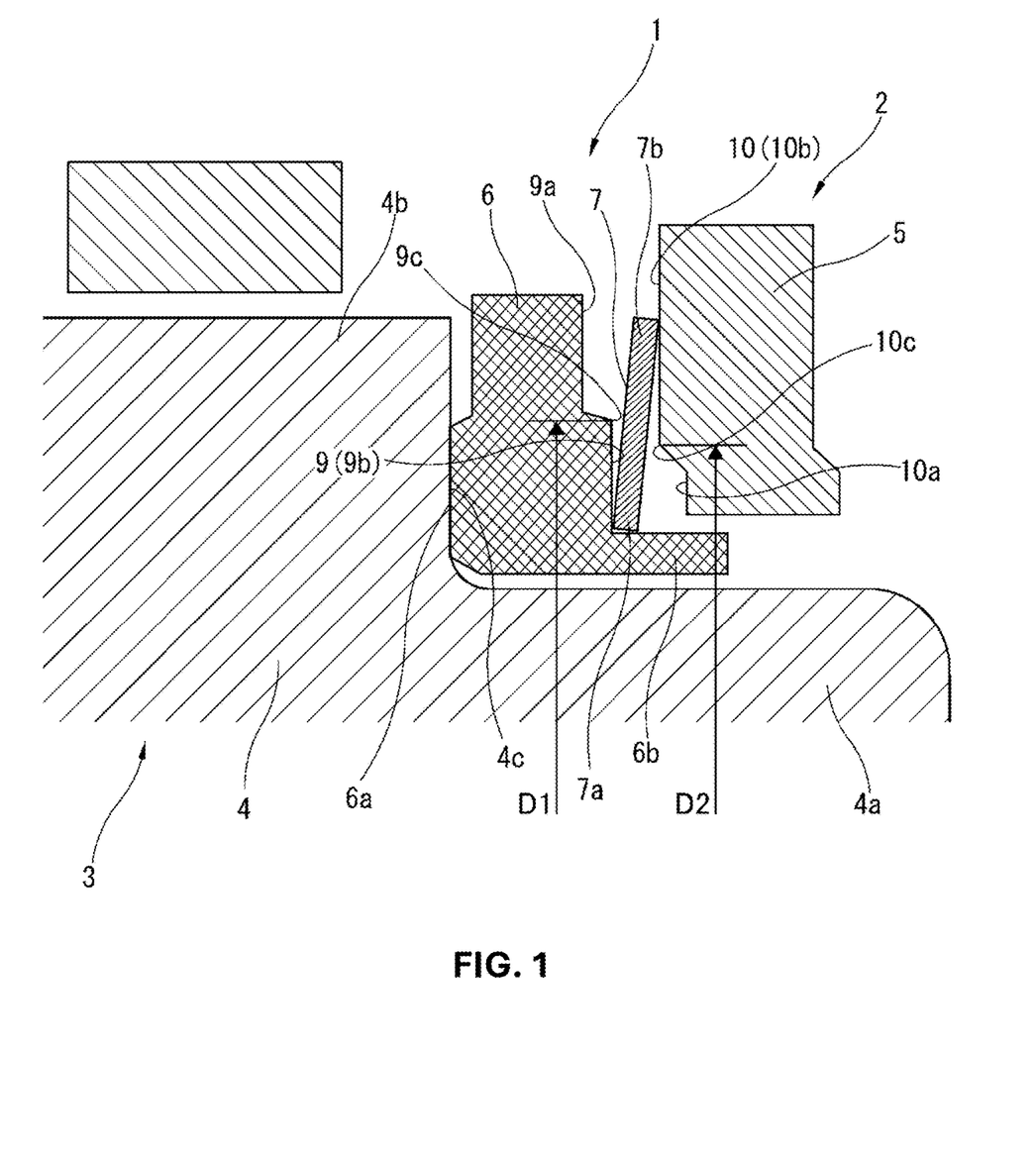
FIG. 1 is a sectional view of a focused part of a friction generation mechanism according to a first embodiment of the present invention.

FIG. 1 shows a friction generation mechanism 1 according to the first embodiment which is a focused part of a damper apparatus according to the present invention. An overall appearance of the damper apparatus is known as disclosed in Patent Document 1 etc., and is omitted in the present drawings. The damper apparatus includes an input-side rotor 2 mounted to a flywheel of an internal combustion engine and structured to receive torque from the internal combustion engine and an output-side rotor 3 combined with input-side rotor 2 relatively rotatably with respect to input-side rotor 2. Output-side rotor 3 includes in its rotational center a spline hub 4 structured to be in spline coupling with an input shaft of a transmission. Spline hub 4 includes a boss part 4a having a cylindrical shape and a disc part 4b spreading radially outwardly from an axially central part of boss part 4a. Incidentally, a left side in FIG. 1 faces the internal combustion engine, and a right side in FIG. 1 faces the transmission.

Input-side rotor 2 has a disc shape composed of a retention plate 5 being substantially circular and facing the transmission and a cover plate (not shown) being substantially circular and facing the internal combustion engine, wherein an outer periphery of retention plate 5 and an outer periphery of the cover plate are joined to each other. Retention plate 5 and the cover plate interpose therebetween disc part 4b of spline hub 4 being a part of output-side rotor 3. Disc part 4b and input-side rotor 2 interpose therebetween a plurality of (e.g. four) coil springs not shown that are arranged along tangential lines of rotation and connect disc part 4b and input-side rotor 2 elastically in a rotational direction thereof. The coil springs exert elastic force and thereby absorb torsional vibration. Each of retention plate 5 and the cover plate not shown is formed by press-forming a metallic plate. FIG. 1 shows only an inner circumferential part of retention plate 5.

Friction generation mechanism 1 is structured to generate frictional torque serving as damping force, in response to relative rotation between input-side rotor 2 and output-side rotor 3. Friction generation mechanism 1 includes a bush 6 and a cone spring 7. Bush 6 has an annular shape, and is made of a hard synthetic resin such as a so-called engineering plastic. Cone spring 7 has an annular shape, and is disposed between bush 6 and retention plate 5 so as to be compressed.

Bush 6 is rotatably fitted to an outer periphery of boss part 4a of spline hub 4, and includes a back face including an annular friction surface 6a being in contact with an annular friction surface 4c of disc part 4b of spline hub 4. Annular friction surface 6a and annular friction surface 4c spread along a plane orthogonal to a rotational central axis, and are in sliding contact with each other to generate the frictional torque. Bush 6 further includes a cylindrical part 6b extending toward the transmission, and has an substantially L-shaped cross section as a whole. Cylindrical part 6b includes an outer periphery to which cone spring 7 is fitted, and determines a radial position of cone spring 7.

Retention plate 5 includes the inner circumferential part facing bush 6 in the axial direction so as to interpose cone spring 7 therebetween. The inner circumferential part of retention plate 5 includes an end positioned in a slightly outer circumferential side with respect to cylindrical part 6b of bush 6. Thus, the end of retention plate 5 and cylindrical part 6b of bush 6 partially overlap with each other in the axial direction.

Figure 2:
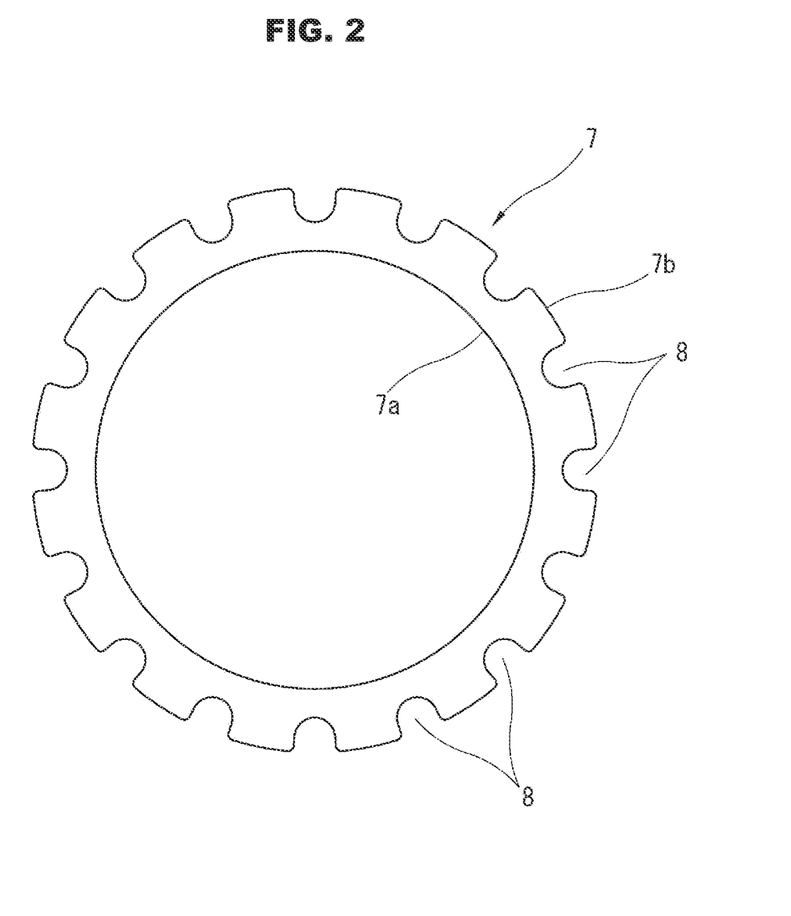
FIG. 2 is a plan view of a cone spring according to the first embodiment.

Cone spring 7 has a tapered cross section inclined at a relatively small angle with respect to a plane perpendicular to the axial direction. According to the first embodiment, cone spring 7 is inclined at an orientation set such that an inner periphery 7a of cone spring 7 is axially nearer to bush 6 than to retention plate 5 while an outer periphery 7b of cone spring 7 is axially nearer to retention plate 5 than to bush 6. Furthermore, as shown in FIG. 2, which is a plan view of cone spring 7 according to the first embodiment, inner periphery 7a of cone spring 7 has a continuous circular shape, while outer periphery 7b of cone spring 7 includes indentations 8 and has an uneven shape.

Bush 6 includes a first load support surface 9 being in contact with inner periphery 7a of cone spring 7. First load support surface 9 spreads perpendicularly to an inner peripheral surface of cylindrical part 6b of bush 6 and parallelly with a plane perpendicular to the axial direction. Retention plate 5 includes a second load support surface 10 being in contact with outer periphery 7b of cone spring 7. Second load support surface 10 spreads parallelly with a plane perpendicular to the axial direction. First load support surface 9 and second load support surface 10 face each other in the axial direction.

First load support surface 9 includes a step part 9a that is retracted in the axial direction so as to accept outer periphery 7b of cone spring 7 in case that cone spring 7 is wrongly installed at a reversed orientation. Step part 9a is positioned in an outer circumferential part of bush 6, and does not contact with cone spring 7 under regular conditions. Accordingly, what substantially serves as first load support surface 9 is a flat surface part 9b formed in an inner circumferential part of first load support surface 9 separately from step part 9a.

Similarly, second load support surface 10 includes a step part 10a that is retracted in the axial direction so as to accept inner periphery 7a of cone spring 7 in case that cone spring 7 is wrongly installed at the reversed orientation. Step part 10a is formed by drawing an inner peripheral edge of retention plate 5 made from a metallic plate. Step part 10*a* does not contact with cone spring 7 under regular conditions. Accordingly, what substantially serves as second load support surface 10 is a flat surface part 10*b* formed in an outer circumferential part of second load support surface 10 separately from step part 10*a*.

As shown in FIG. 1, step part 9*a* of first load support surface 9 has a boundary 9*c* positioned outer in a radial direction, with respect to a boundary 10*c* of step part 10*a* of second load support surface 10. In other words, a radius D1 to boundary 9*c* of first load support surface 9 is greater than a radius D2 to boundary 10*c* of second load support surface 10. Accordingly, when viewing first load support surface 9 and second load support surface 10 at a projection view in the axial direction, flat surface part 9*b* and flat surface part 10*b* overlap with each other through a certain radial width, wherein flat surface part 9*b* is formed in the inner circumferential part of first load support surface 9 and substantially serves as first load support surface 9, and wherein flat surface part 10*b* is formed in the outer circumferential part of second load support surface 10 and substantially serves as second load support surface 10.

Thus, friction generation mechanism 1 is configured such that cone spring 7 including outer periphery 7*b* supported by retention plate 5 biases bush 6 toward disc part 4*b* in the axial direction. This causes annular friction surface 6*a* and annular friction surface 4*c* to be in appropriate press contact with each other.

Figure 3:
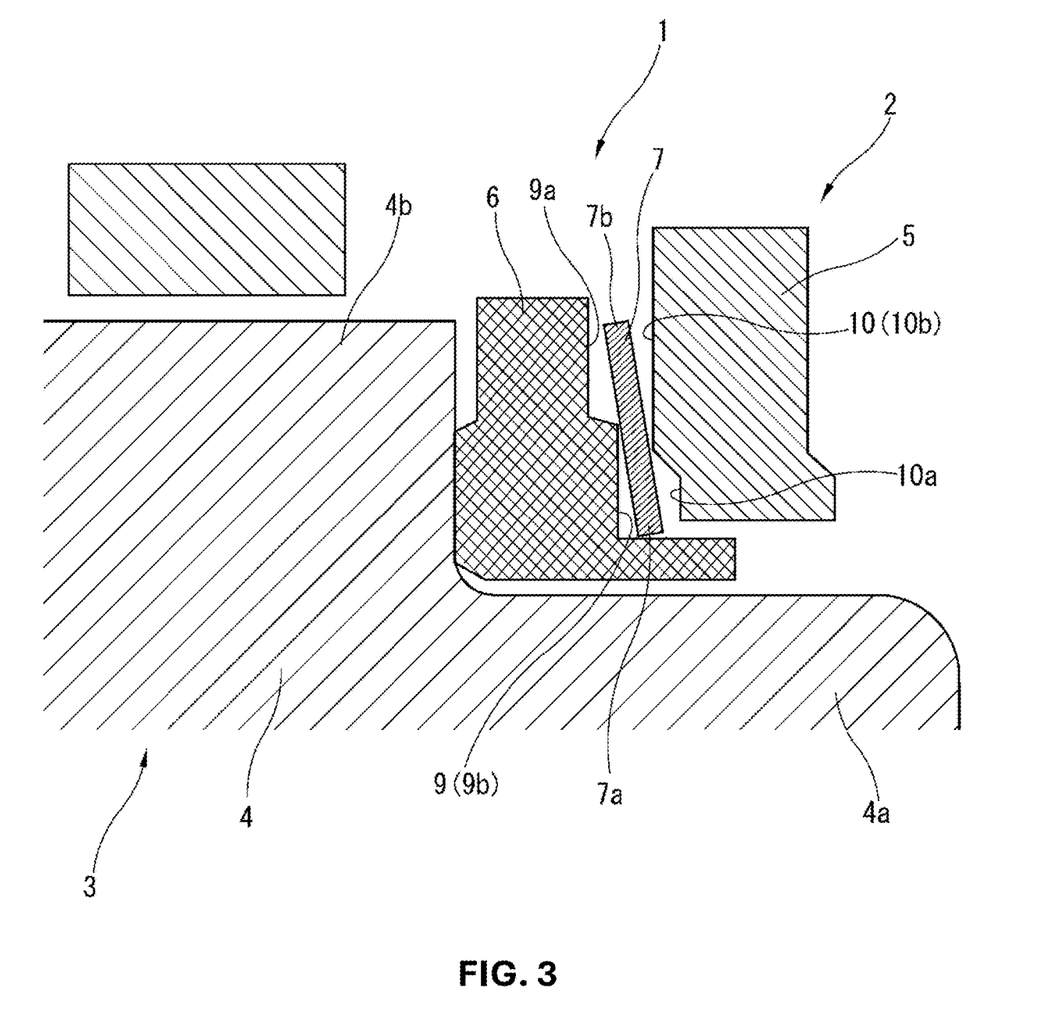
FIG. 3 is a sectional view in case that the cone spring is installed at a reversed orientation.

Step part 9*a* of first load support surface 9 and step part 10*a* of second load support surface 10 contribute to an inspection process for detecting wrong installation of cone spring 7 in which cone spring 7 is installed in the reversed orientation. FIG. 3 shows a state in which cone spring 7 is wrongly installed at the reversed orientation. In this state, cone spring 7 is tapered reversely in comparison with the regular attitude, and outer periphery 7*b* enters step part 9*a*, and inner periphery 7*a* enters step part 10*a*. This greatly reduces the force axially biasing cone spring 7, as is obvious in comparison with FIG. 1. This allows the wrong installation to be easily detected by measuring the friction torque of friction generation mechanism 1 after assembling the damper apparatus.

In the state of FIG. 1 in which cone spring 7 is installed at the regular orientation, outer periphery 7*b* having the uneven shape is in contact with retention plate 5 made of a metal, while inner periphery 7*a* having the smoothly continuous circular shape is in contact with bush 6 made of a synthetic resin. In the state of FIG. 3 in which cone spring 7 is installed at the reversed orientation, outer periphery 7*b* having the uneven shape is in contact with bush 6 made of a synthetic resin. This deteriorates the apparatus in durability. Therefore, the wrong installation has to be inspected and eliminated after assembly. If cone spring 7 is installed at the reversed orientation between first load support surface 9 and second load support surface 10 without step part 9*a* and step part 10*a*, it is difficult to detect the wrong installation on the basis of the friction torque because the biasing force is approximately equal to that in case of the regular orientation.

The configuration of forming step part 9*a* and step part 10*a* might cause a phenomenon of turning over the taper of cone spring 7 from the regular orientation into the reversed orientation in case that cone spring 7 receives an excessive load in the axial direction. However, the first embodiment is configured to satisfy the relation of D1>D2 as described above. This suppresses cone spring 7 from undergoing the turning over even if cone spring 7 receives an excessive load in the axial direction. In detail, even if receiving such excessive axial load, cone spring 7 is merely sandwiched and compressed in a region between radius D1 and radius D2 by first load support surface 9 and second load support surface 10 (i.e., flat surface part 9*b* and flat surface part 10*b*) that are parallel with each other and are both parallel with a plane perpendicular to the axial direction. Accordingly, cone spring 7 does not receive a moment to turn over cone spring 7. This effect is further explained in the following with reference to the second embodiment.

Figure 4:
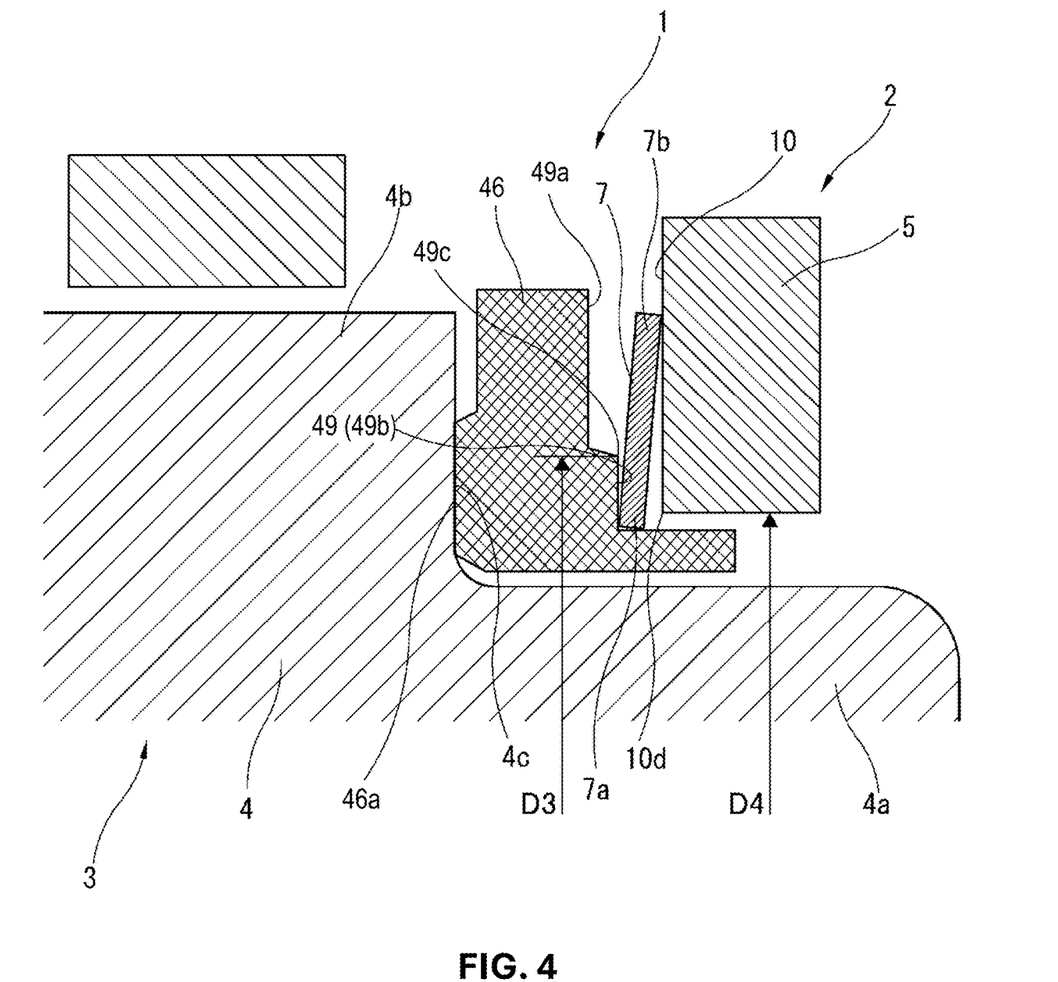
FIG. 4 is a sectional view of a focused part of a friction generation mechanism according to a second embodiment of the present invention.

FIG. 4 shows the second embodiment of friction generation mechanism 1. The following omits explanation overlapping with that in the first embodiment. Similarly to the first embodiment, the second embodiment is configured such that first load support surface 49 of bush 46 includes step part 49*a* structured to accept outer periphery 7*b* of cone spring 7 in case that cone spring 7 is wrongly installed at the reversed orientation. On the other hand, second load support surface 10 of retention plate 5 does not include step part 10*a* shown in the first embodiment. Thus, second load support surface 10 according to the second embodiment is flat all the way to its inner peripheral edge 10*d* facing a vicinity of inner periphery 7*a* of cone spring 7.

Boundary 49*c* of step part 49*a* of first load support surface 49 is positioned radially outer with respect to inner peripheral edge 10*d* of second load support surface 10. In other words, a radius D3 to boundary 49*c* of first load support surface 49 is greater than a radius D4 to inner peripheral edge 10*d* of second load support surface 10. Accordingly, when viewing first load support surface 49 and second load support surface 10 at a projection view in the axial direction, flat surface part 49*b* and second load support surface 10 overlap with each other through a certain radial width, wherein flat surface part 49*b* is formed in the inner circumferential part of first load support surface 49 and substantially serves as first load support surface 49, and wherein second load support surface 10 is flat.

Even such configuration of forming only step part 49*a* of first load support surface 49 allows outer periphery 7*b* of cone spring 7 to enter step part 49*a*, and greatly reduces the axial biasing force on cone spring 7, in case that cone spring 7 is wrongly installed at the reversed orientation. This facilitates detection of the wrong installation in the inspection process.

Furthermore, the second embodiment satisfies the relation of D3>D4, and thereby, similarly to the first embodiment, serves to avoid the turning over of cone spring 7 in response to an axial excessive load.

Figure 5A:
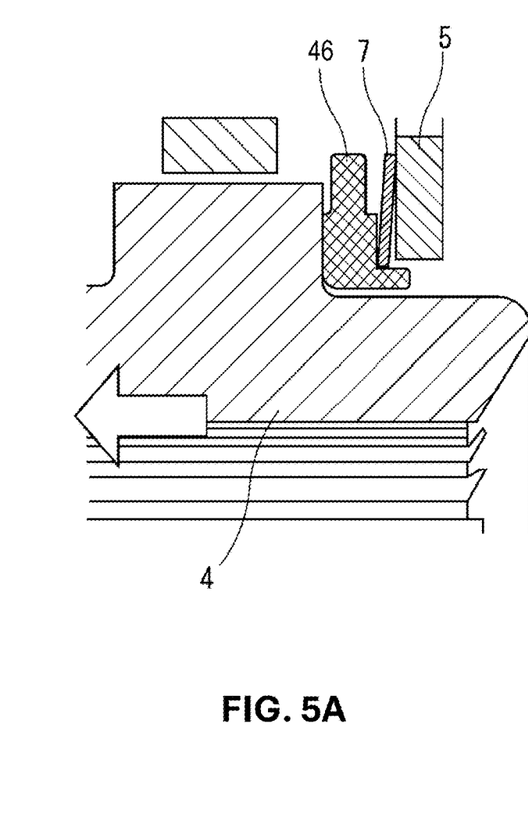
FIGS. 5A to 5C are illustrative views of the friction generation mechanism according to the second embodiment when receiving axial loads.
Figure 5B:
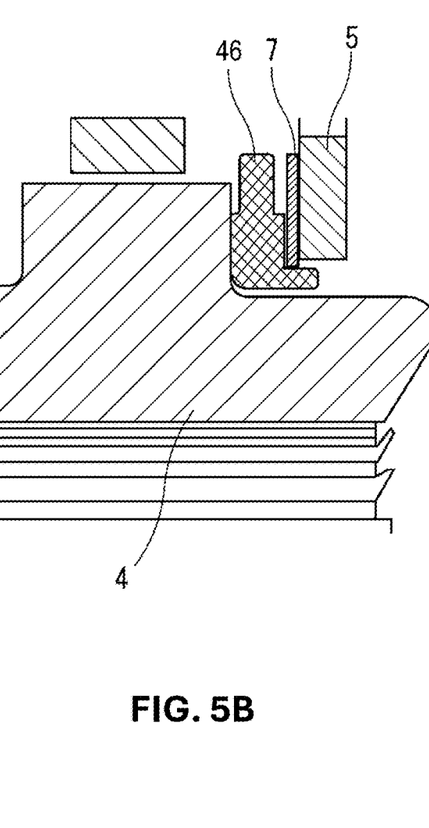
Figure 5C:
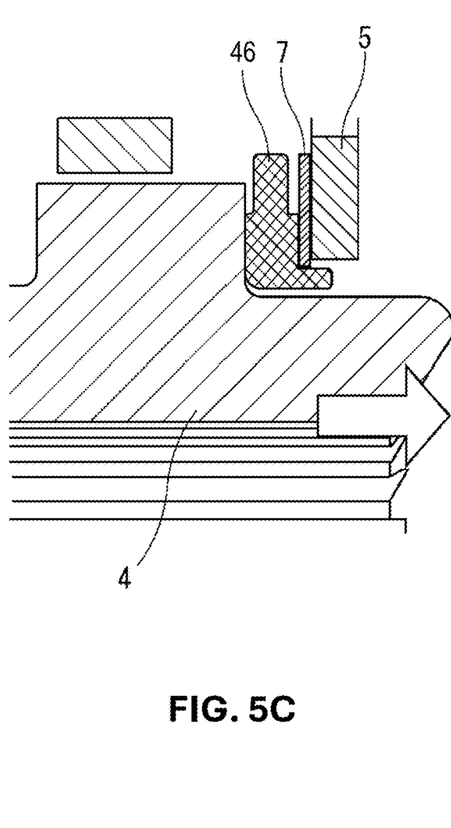

FIGS. 5A to 5C illustrate a mechanism for avoiding the turning over of cone spring 7 in response to an axial load, which takes the second embodiment for example. FIG. 5B shows a neutral state with no axial load. In this example, cone spring 7 is approximately flat because cone spring 7 is compressed in an initial state after installation thereof. FIG. 5A shows a state in which spline hub 4 is receiving an axial load to the left side of the drawing as shown by an arrow therein, wherein spline hub 4 is a part of output-side rotor 3 while retention plate 5 is a part of input-side rotor 2. The axial load in this direction has no effect to cause the turning over of cone spring 7.

FIG. 5C shows a state in which spline hub 4 of output-side rotor 3 is receiving an axial load to the right side of the drawing as shown by an arrow therein. In this state, inner periphery 7*a* of cone spring 7 is pressed to the right side of the drawing, while outer periphery 7*b* of cone spring 7 is pressed to the left side of the drawing. However, since the relation of D3>D4 is satisfied, cone spring 7 is sandwiched and compressed by first load support surface 49 (in detail, flat surface part 49b) and second load support surface 10 that overlap with each other and are both flat. Accordingly, cone spring 7 does not receive a moment to turn over cone spring 7.

Figure 6A:
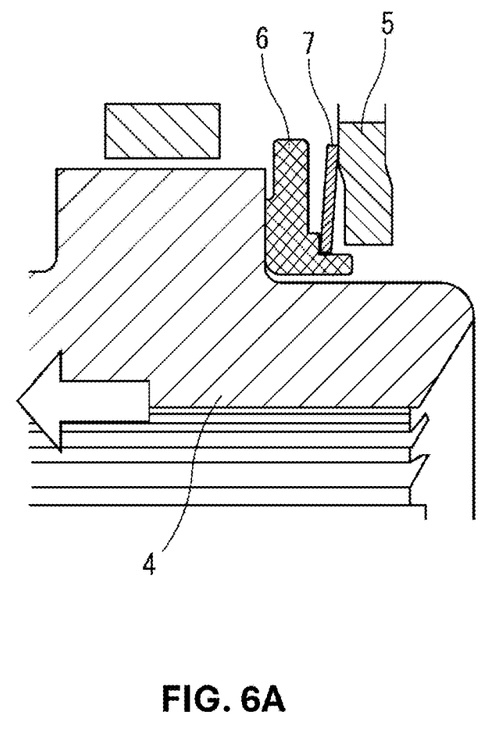
FIGS. 6A to 6C are illustrative views of a friction generation mechanism according to a comparative example when receiving axial loads.
Figure 6B:
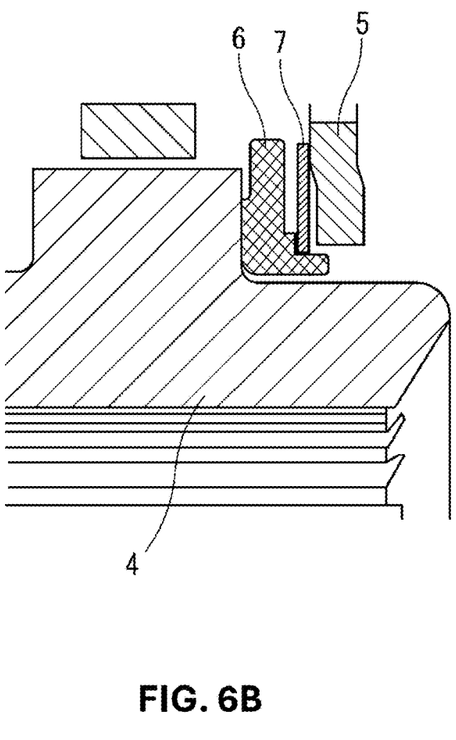
Figure 6C:
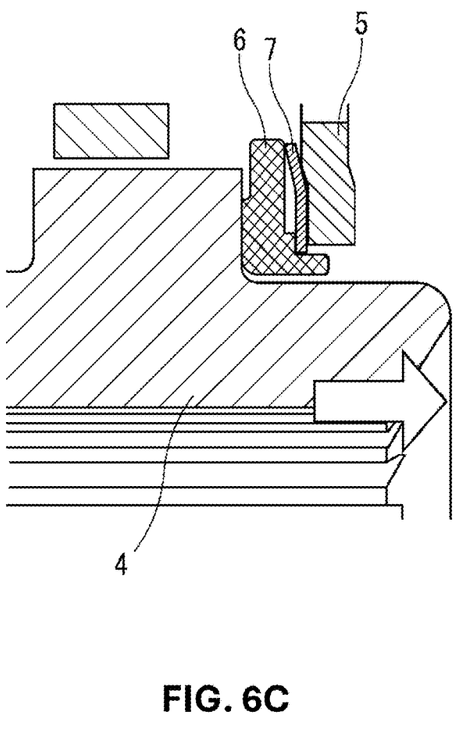

FIGS. 6A to 6C illustrate the turning over of cone spring 7 as a comparative example. This comparative example corresponds to a case of, for example, inverting the relation between radius D1 and radius D2 in the first embodiment in FIG. 1 into a relation of D1<D2. In this case, boundary 9c of step part 9a of first load support surface 9 is positioned in the inner circumferential side with respect to boundary 10c of step part 10a of second load support surface 10. FIG. 6B shows a neutral state with no axial load. FIG. 6A shows a state in which spline hub 4 is receiving an axial load to the left side of the drawing as shown by an arrow therein, wherein spline hub 4 is the part of output-side rotor 3 while retention plate 5 is the part of input-side rotor 2.

FIG. 6C shows a state in which spline hub 4 of output-side rotor 3 is receiving an axial load to the right side of the drawing as shown by an arrow therein. If the considerable axial load is exerted in the direction shown in FIG. 6C, inner periphery 7a of cone spring 7 is pressed to the right side of the drawing, while outer periphery 7b of cone spring 7 is pressed to the left side of the drawing. In this state, a force pressing cone spring 7 to the right side of the drawing has a point of action positioned in the inner circumferential side with respect to a point of action of a force pressing cone spring 7 to the left side of the drawing. This generates a moment to bring the taper of cone spring 7 to a reversed state beyond a flat state, and may turn over cone spring 7 as shown in the drawing. Furthermore, the turning over of cone spring 7 often causes a crack.

Figure 7:
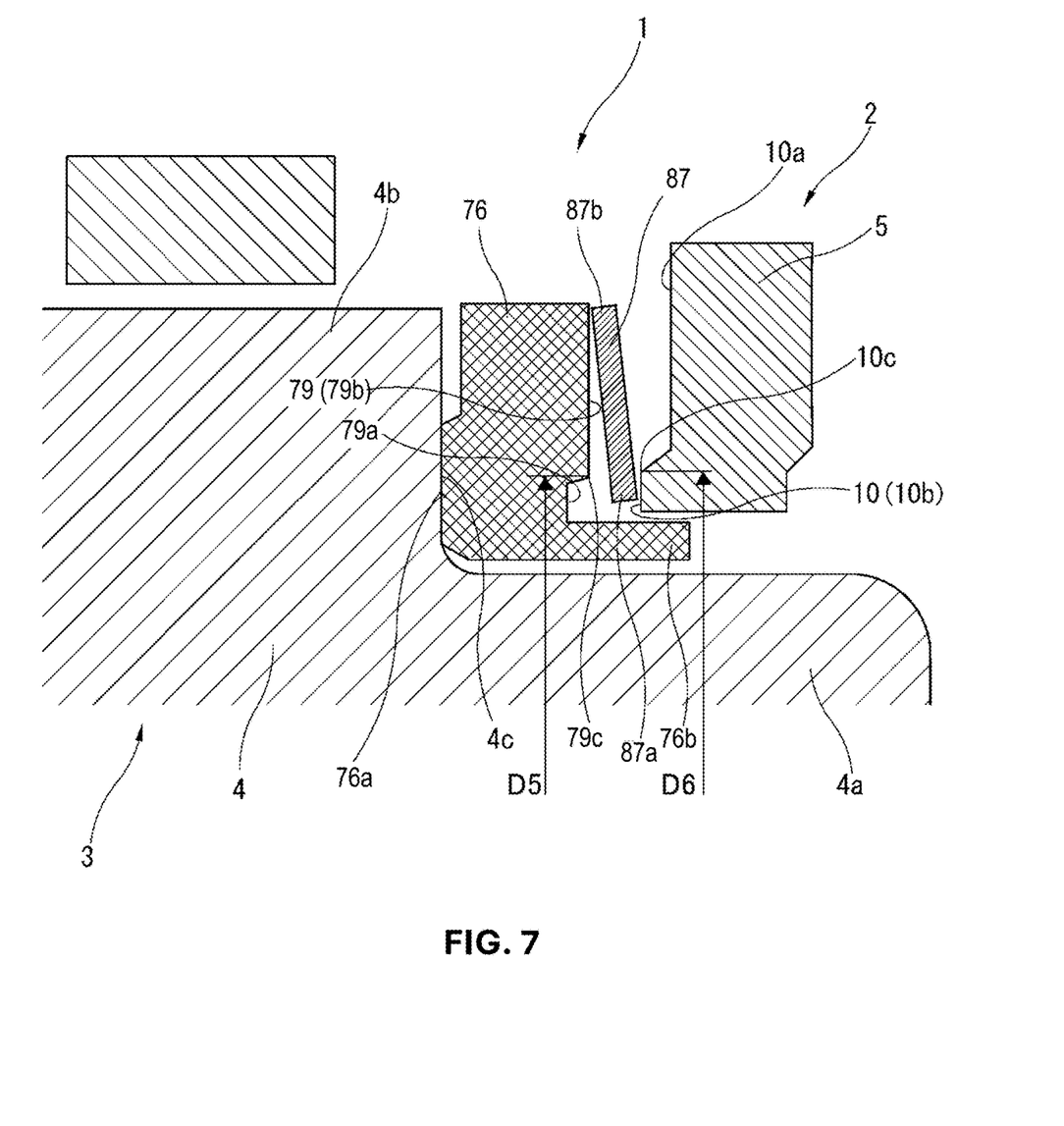
FIG. 7 is a sectional view of a focused part of a friction generation mechanism according to a third embodiment of the present invention.
Figure 8:
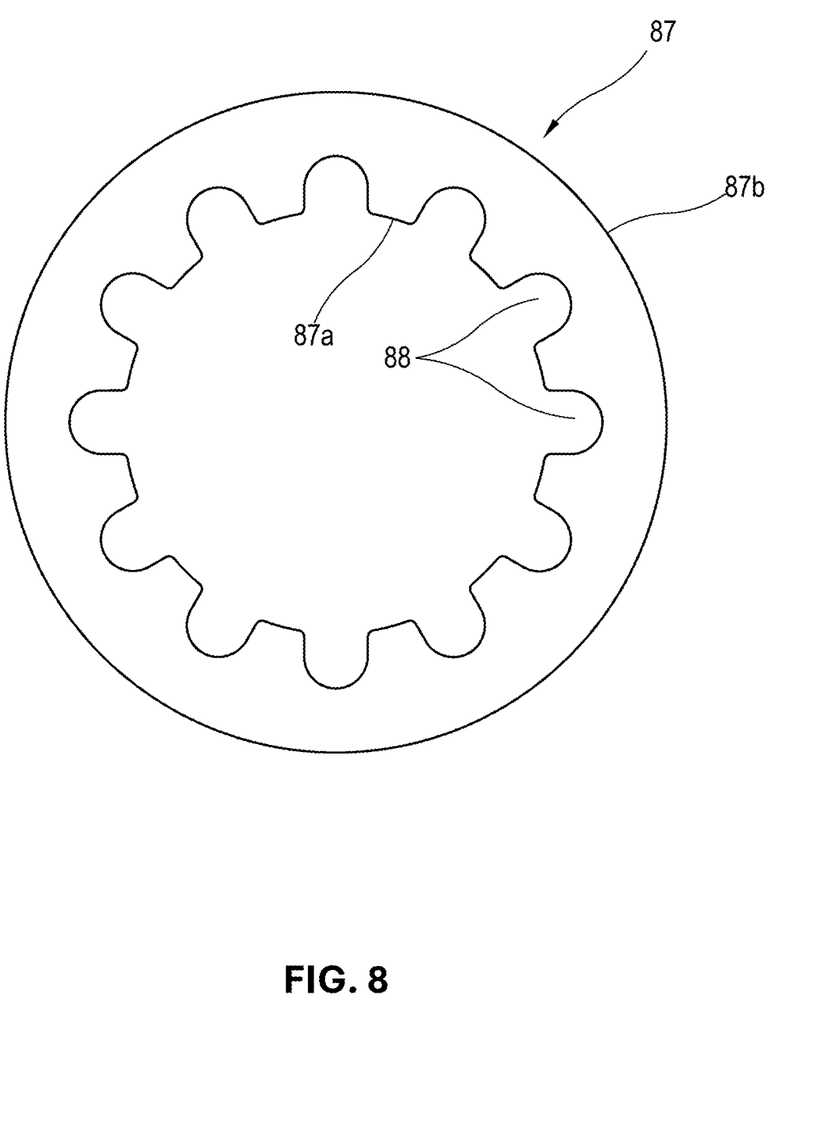
FIG. 8 is a plan view of a cone spring according to the third embodiment.

The following describes the third embodiment of friction generation mechanism 1. According to the third embodiment, cone spring 87 has a tapered cross section inclined inversely with respect to the first and second embodiments. Furthermore, as shown in FIG. 8, cone spring 87 according to the third embodiment includes outer periphery 87b having a continuous circular shape and inner periphery 87a including indentations 88 and having an uneven shape.

Bush 76 includes first load support surface 79 structured to be in contact with outer periphery 87b of cone spring 87. Retention plate 5 includes second load support surface 10 structured to be in contact with inner periphery 87a of cone spring 87. First load support surface 79 and second load support surface 10 are both parallel with a plane perpendicular to the axial direction, and face each other in the axial direction.

First load support surface 79 includes, in its inner circumferential side, step part 79a that is retracted in the axial direction so as to accept inner periphery 87a of cone spring 87 in case that cone spring 87 is wrongly installed at a reversed orientation. Step part 79a does not contact with cone spring 87 under regular conditions. Accordingly, what substantially serves as first load support surface 79 is flat surface part 79b formed in an outer circumferential part of first load support surface 79 separately from step part 79a.

Similarly, second load support surface 10 includes, in its outer peripheral part, step part 10a that is retracted in the axial direction so as to accept outer periphery 87b of cone spring 87 in case that cone spring 87 is wrongly installed at a reversed orientation. Step part 10a does not contact with cone spring 87 under regular conditions. Accordingly, what substantially serves as second load support surface 10 is flat surface part 10b formed in an inner circumferential part of second load support surface 10 separately from step part 10a.

Boundary 79c of step part 79a of first load support surface 79 is positioned radially inner with respect to boundary 10c of step part 10a of second load support surface 10. In other words, as shown in FIG. 7, a radius D5 to boundary 79c of first load support surface 79 is less than a radius D6 to boundary 10c of second load support surface 10. Accordingly, when viewing first load support surface 79 and second load support surface 10 at a projection view in the axial direction, flat surface part 79b and flat surface part 10b overlap with each other through a certain radial width, wherein flat surface part 79b is formed in the outer circumferential part of first load support surface 79 and substantially serves as first load support surface 79, and wherein flat surface part 10b is formed in the inner circumferential part of second load support surface 10 and substantially serves as second load support surface 10.

Thus, also the third embodiment is configured to allow inner periphery 87a and outer periphery 87b of cone spring 87 to respectively enter step part 79a and step part 10a, and greatly reduce the force biasing cone spring 87, in case that cone spring 87 is wrongly installed at the reversed orientation. This facilitates detection of abnormality in the inspection process.

Furthermore, even in case of receiving an excessive axial load, the third embodiment serves to suppress generation of a moment to turn over the orientation of the taper because the third embodiment satisfies the relation of D5<D6. This suppresses cone spring 87 from undergoing the turning over, similarly to the first and second embodiments.

In addition, according to the third embodiment, inner periphery 87a of cone spring 87 having the uneven shape is in contact with retention plate 5 made of a metal.

Figure 9:
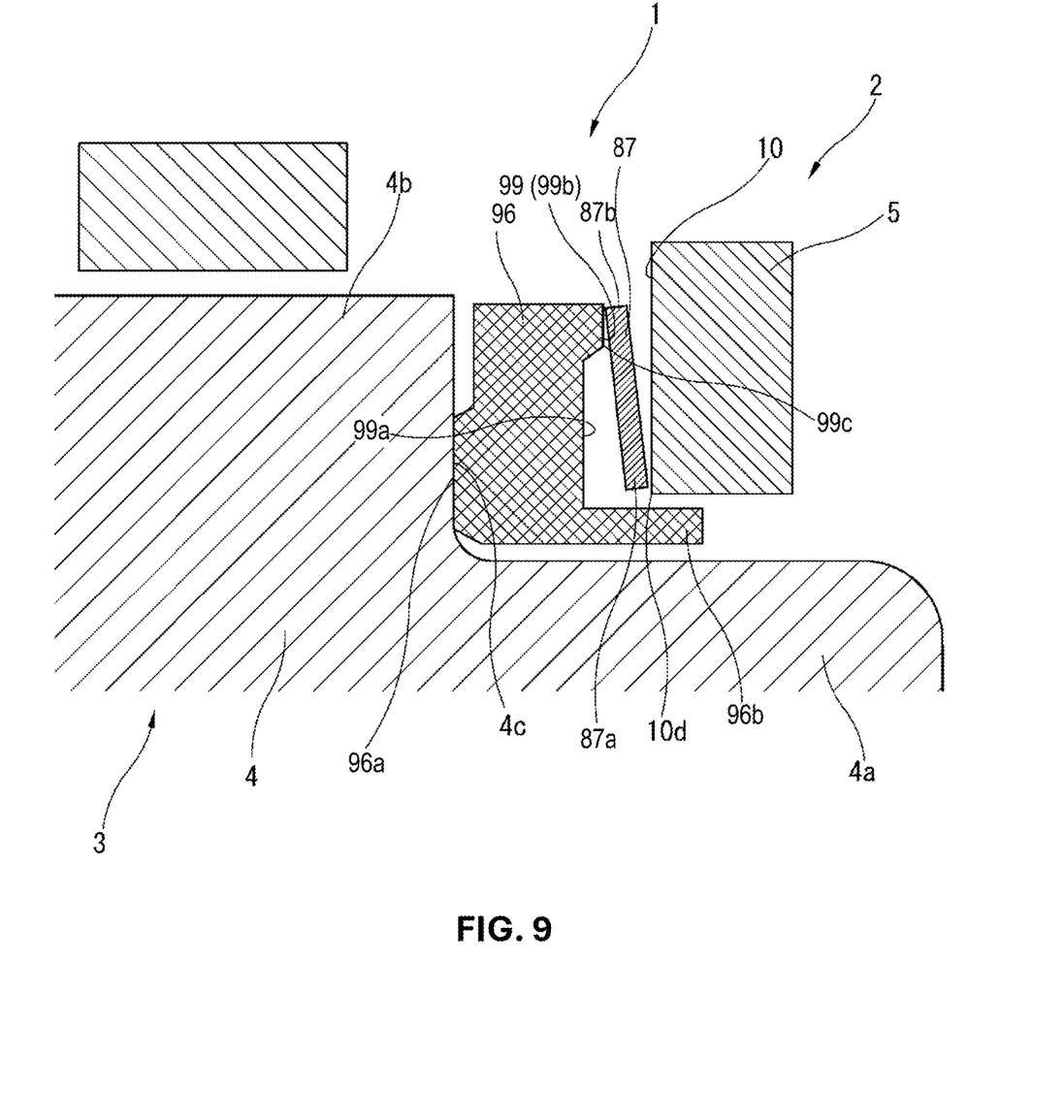
FIG. 9 is a sectional view of a focused part of a friction generation mechanism according to a fourth embodiment of the present invention.

FIG. 9 shows the fourth embodiment of friction generation mechanism 1. Similarly to the third embodiment, the fourth embodiment is configured to form step part 99a in an inner circumferential part of first load support surface 99 of bush 26 so as to accept inner periphery 87a of cone spring 87 in case that cone spring 87 is wrongly installed at the reversed orientation. On the other hand, second load support surface 10 of retention plate 5 does not include step part 10a shown in the third embodiment. In other words, second load support surface 10 according to the fourth embodiment is flat all the way from inner peripheral edge 10d to a part facing a vicinity of outer periphery 87b of cone spring 87.

Boundary 99c of step part 99a of first load support surface 99 is radially positioned within a radial range of second load support surface 10 being flat. Accordingly, when viewing first load support surface 99 and second load support surface 10 at a projection view in the axial direction, flat surface part 99b overlaps with second load support surface 10 being flat, wherein flat surface part 99b is formed in an outer circumferential part of first load support surface 99 and substantially serves as first load support surface 99.

Even such configuration of forming only step part 99a of first load support surface 99 allows inner periphery 87a of cone spring 87 to enter step part 99a, and greatly reduces the axial biasing force on cone spring 87, in case that cone spring 87 is wrongly installed at the reversed orientation. This facilitates detection of the wrong installation in the inspection process.

Furthermore, flat surface part 99b in the outer circumferential part of first load support surface 99 is radially positioned to overlap with second load support surface 10 being flat. This serves to avoid the turning over of cone spring 87 in response to an axial excessive load, similarly to the third embodiment.

The invention claimed is:

1. A damper apparatus comprising:
   a first rotor;
   a second rotor relatively rotatable with respect to the first rotor;
   a spring connecting the first rotor and the second rotor elastically in a rotational direction; and
   a friction generation mechanism structured to generate frictional torque in response to relative rotation between the first rotor and the second rotor,
   wherein:
   the friction generation mechanism includes:
      a bush that has a substantially L-shaped cross section, and includes a back face being in contact with an annular friction surface of the second rotor;
      a retention plate that is a part of the first rotor, and faces the bush in an axial direction; and
      a cone spring that has an annular shape, and is disposed between the bush and the retention plate so as to be compressed, and biases the bush toward the annular friction surface of the second rotor;
   the bush includes a first load support surface being in contact with an inner periphery of the cone spring;
   the retention plate includes a second load support surface being in contact with an outer periphery of the cone spring;
   the first load support surface and the second load support surface face each other;
   the first load support surface and the second load support surface respectively include a first step part and a second step part that are retracted in the axial direction so as to respectively accept the outer periphery and the inner periphery of the cone spring in case that the cone spring is installed at a reversed orientation; and
   the first step part of the first load support surface has a boundary that is positioned outer in a radial direction, with respect to a boundary of the second step part of the second load support surface.

2. The damper apparatus as claimed in claim 1, wherein:
   the inner periphery of the cone spring has a continuous circular shape; and
   the outer periphery of the cone spring includes indentations, and has an uneven shape.

3. The damper apparatus as claimed in claim 1, wherein:
   the bush is made of a synthetic resin; and
   the retention plate is made of a metal.

4. The damper apparatus as claimed in claim 1, wherein the cone spring has a continuous circular portion that is in contact with the bush.

5. The damper apparatus as claimed in claim 1, wherein the cone spring has an unevenly shaped portion that is in contact with the retention plate.

6. The damper apparatus as claimed in claim 1, wherein a first radius to the boundary of the first step part is greater than a second radius to the boundary of the second step part.

7. The damper apparatus as claimed in claim 6, wherein the cone spring is sandwiched in a region between the first radius and the second radius.

8. The damper apparatus as claimed in claim 1, wherein the first load support surface is parallel to the second load support surface.

9. The damper apparatus as claimed in claim 8, wherein the first load support surface and the second load support surface are perpendicular to the axial direction.

* * * * *